United States Patent [19]
Dowling et al.

[11] Patent Number: 5,372,095
[45] Date of Patent: Dec. 13, 1994

[54] PET LITTER BOX SIFTER

[75] Inventors: Earl Dowling, Lacombe; Tod Hummelle, Ponoka, both of Canada

[73] Assignee: Allbrook Developments Ltd., Ponoka, Canada; part interest of

[21] Appl. No.: 149,240

[22] Filed: Nov. 9, 1993

[51] Int. Cl.⁵ .............................................. A01K 29/00
[52] U.S. Cl. ................................................... 119/166
[58] Field of Search ............... 119/165, 166, 167, 168; 209/417, 418, 419

[56] References Cited

U.S. PATENT DOCUMENTS

| | | | |
|---|---|---|---|
| 3,796,188 | 3/1974 | Bradstreet | 119/166 |
| 4,325,325 | 4/1982 | Larter | 119/166 |
| 4,505,226 | 3/1985 | Carlson | 119/166 |
| 4,771,731 | 9/1988 | Derx et al. | 119/166 |
| 4,817,560 | 4/1989 | Prince et al. | 119/166 |
| 4,862,830 | 9/1989 | Michael | 119/165 |
| 5,211,133 | 5/1993 | Foley | 119/166 |

*Primary Examiner*—Gene Mancene
*Assistant Examiner*—Thomas Price
*Attorney, Agent, or Firm*—Anthony R. Lambert

[57] ABSTRACT

A pet litter box sifter is described includes a rigid grid-form containment tray having a bottom, a peripheral top edge, and walls extending upwardly from the bottom to the peripheral top edge. A window-like opening in one of the walls adjacent the bottom. The pet litter box sifter, as described, is easier to dump.

4 Claims, 1 Drawing Sheet

PET LITTER BOX SIFTER

BACKGROUND OF THE INVENTION

U.S. Pat. No. 4,817,560 which issued to Prince et al in 1989 discloses a pet litter box sifter. This reference discloses a grid-like structure which is intended for insertion into a pet litter box. The grid-like structure is left in place while the pet is using the litter box. When the pet is finished solid excrement is removed simply by raising the litter box sifter and then dumping the contents.

It is difficult to dump the excrement without having some spillage at the best of times, for the urine tends to bind the pet litter into clumps which become attached to the grid-like structure. The pet owner can get these clumps loose by banging on the side of the pet letter box sifter. However, if the pet litter box sifter is partially inverted when the clumps release the pet litter is scattered around, instead of in, the waste container into which the pet litter box sifter is being dumped.

SUMMARY OF THE INVENTION

What is required is a pet litter box sifter which better facilitates disposal of pet excrement.

According to the present invention there is provided a pet litter box sifter which includes a rigid grid-form containment tray having a bottom, a peripheral top edge, and walls extending upwardly from the bottom to the peripheral top edge. A window-like opening in one of the walls adjacent the bottom.

With the pet litter box sifter, as described, the window-like opening in the wall adjacent the bottom permits the pet litter box sifter to be dumped without inverting the sifter during dumping. As clumps are released the bottom of the sifter serves as an inclined chute which serves to direct the through the window-like opening.

Although beneficial results may be obtained through the use of the pet litter box sifter, as described above, difficulty can be encountered in positioning the sifter inside of a litter box filled with litter. Even more beneficial results may, therefore, be obtained when the rigid grid-form containment tray is in the shape of a truncated inverted pyramid with walls extending upwardly and outwardly from the bottom to the peripheral top edge.

With the pet litter box sifter, as described above, the truncated inverted pyramid shape provides room around the periphery of the sifter to enable the sifter to be reciprocally moved back and forth until the sifter is worked to the desired depth within the litter.

Although beneficial results may be obtained through the use of the pet litter box sifter, as described above, it is undesirable to have litter passing between the peripheral top edge of the sifter and the litter box. Even more beneficial results may, therefore, be obtained when a flange extends outwardly from the peripheral top edge. This flange is adapted to overlie the peripheral edge of the pet litter box.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
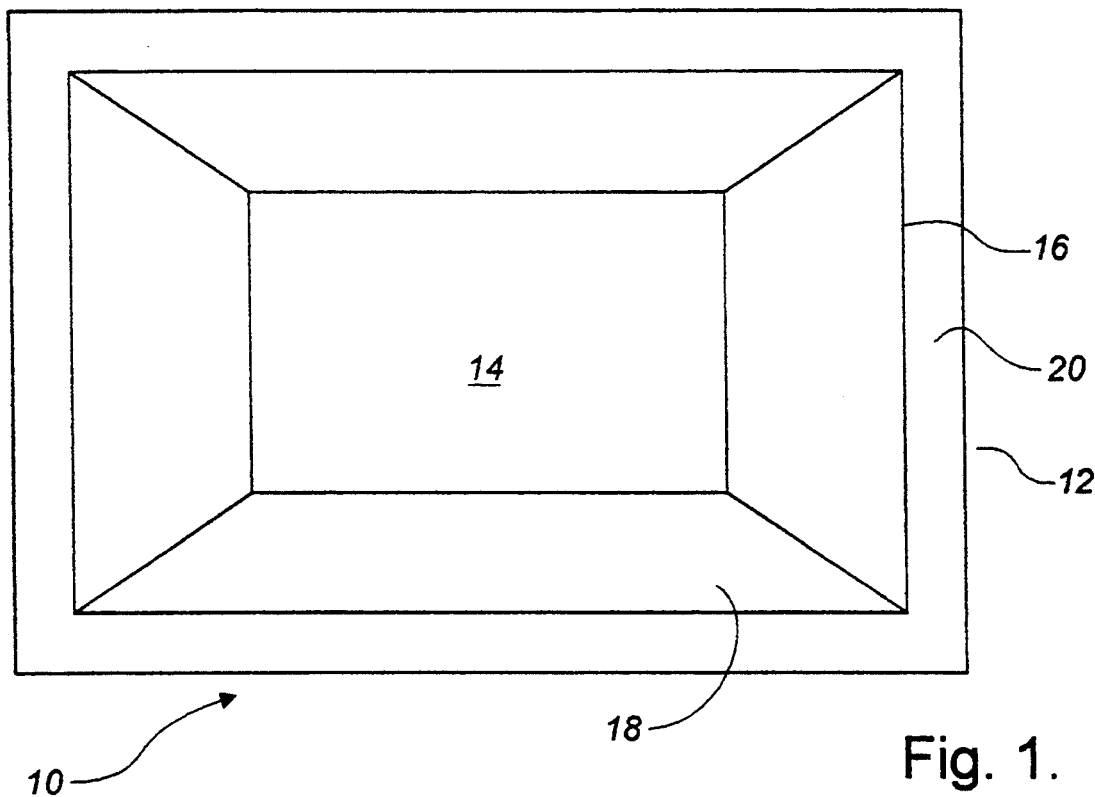
FIG. 1 is a top plan view of a pet litter box sifter constructed in accordance with the teachings of the present invention.
Figure 2:
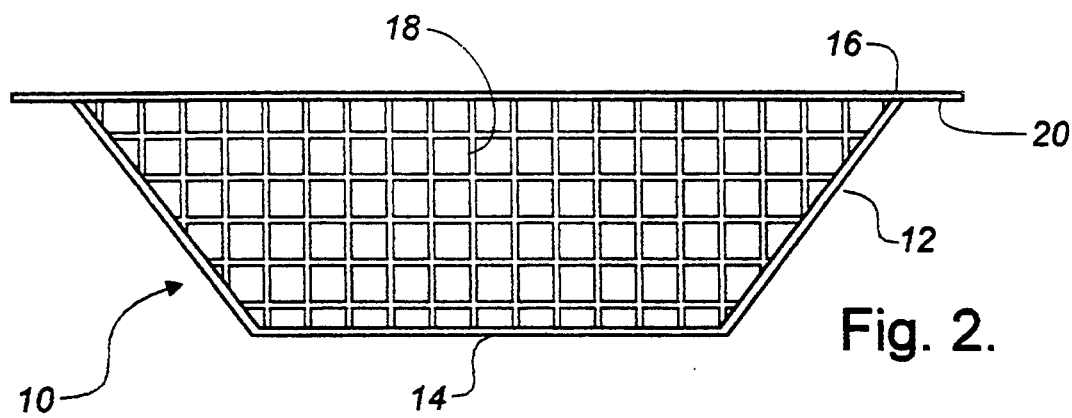
FIG. 2 is a side elevation view of the pet litter box sifter illustrated in FIG. 1.
Figure 3:
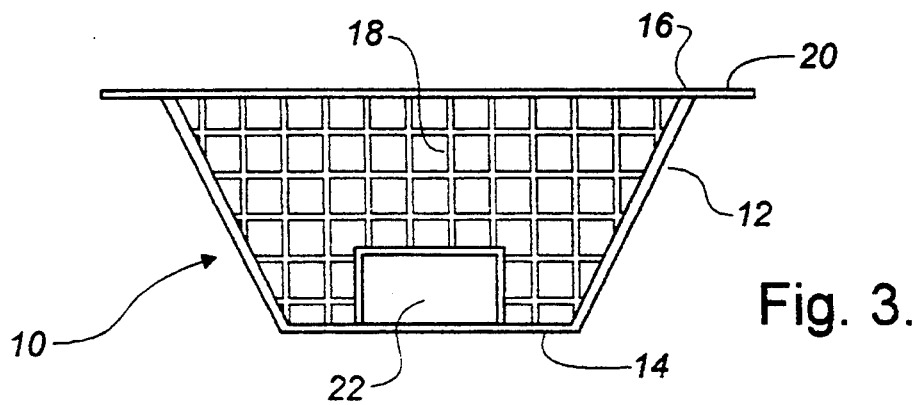
FIG. 3 is an end elevation view of the pet litter box sifter illustrated in FIG. 1.

The preferred embodiment, a pet litter box sifter generally identified by reference numeral 10, will now be described with reference to FIGS. 1 through 3.

Pet litter box sifter 10 includes a rigid grid-form containment tray 12 in the shape of a truncated inverted pyramid. Containment tray 12 has a bottom 14, a peripheral top edge 16 and walls 18 extending upwardly and outwardly from bottom 14 to peripheral top edge 16. A flange 20 extends outwardly from peripheral top edge 16. A window-like opening 22 is provided in one of walls 18 adjacent bottom 14.

The use and operation of pet litter box sifter 10 will now be described with reference to FIGS. 1 through 3. Pet litter box sifter 10 is inserted into a pet litter box filled with pet litter (not shown) by working pet litter box sifter 10 back and forth to force pet litter up through the grid-form of containment tray 12. Containment tray 12 must be rigid to enable this to be successful. The inverted truncated pyramid shape of containment tray 12 provides room between the pet litter box (not shown) and pet litter box sifter 10 to accommodate the reciprocating motion. When properly in place ready for use flange 20 overlies the periphery of the pet litter box. Once the pet litter box has become soiled with excrement, pet litter box sifter 10 is raised taking with it the cat feces and pet litter held in clumps to the grid-form of containment tray 12 by urine. Pet litter box sifter 10 is then dumped into a garbage container by inclining containment tray 12 to serve as a chute to propel the feces through window-like opening 22 by force of gravity. The clumps of pet litter are similarly removed by tapping the side of inclined containment tray 12. Some pet litter granules break off the clumps and fall through the grid-form into the garbage container, the clumps themselves pass through window-like openings 22.

It will be apparent to one skilled in the art that pet litter box sifter 10 is easier to dump. There is no longer a need to invert the litter box sifter, with the attendant dangers of clumps releasing at an inopportune time to fall on the floor. The feces and clumps of pet litter can more readily be controlled when dumping through window-like opening 22. In addition the shape of containment tray 12 makes it easier to place pet litter box sifter 10 back into a litter box filled with pet litter. It will finally be apparent to one skilled in the art that modifications may be made to the illustrated embodiment without departing from the spirit and scope of the invention as defined by the claims.

The embodiments of the invention in which an exclusive property or privilege is claimed are as follows:

1. A pet litter box sifter, comprising:
   a. a rigid grid-form containment tray integrally formed of polymer plastic having a bottom, a peripheral top edge, walls extending upwardly from the bottom to the peripheral top edge; and
   b. an enlargement in the grid of one of the walls adjacent the bottom and spaced from adjacent walls forms a window-like opening such that clumps of litter too large to pass through the grid can pass through the window-like opening.

2. A pet litter box sifter as defined in claim 1, wherein the rigid grid-form containment tray is in the shape of a truncated inverted pyramid with walls extending upwardly and outwardly from the bottom to the peripheral top edge.

3. The pet litter box sifter as defined in claim 2, wherein an overhanging and shielding flange extends outwardly from the peripheral top edge, thereby forming a barrier against litter spatter.

4. A pet litter box sifter, comprising:
   a. a rigid grid-form containment tray in the shape of a truncated inverted pyramid having a bottom, a peripheral top edge, walls extending upwardly and outwardly from the bottom to the peripheral top edge;
   b. a flange extending outwardly from the peripheral top edge; and
   c. an enlargement in the grid of one of the walls adjacent the bottom and spaced from adjacent wall forms a window-like opening such that clumps of litter too large to pass through the grind can pass through the window-like opening.

* * * * *